US009333539B2

(12) United States Patent
Berger et al.

(10) Patent No.: US 9,333,539 B2
(45) Date of Patent: May 10, 2016

(54) METHOD AND DEVICE FOR PROCESSING AND TRANSPORTING ITEMS IN A SEQUENCE

(75) Inventors: Gisbert Berger, Berlin (DE); Jörg-Andreas Illmaier, Kreuzlingen (CH)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 2114 days.

(21) Appl. No.: 12/212,972

(22) Filed: Sep. 18, 2008

(65) Prior Publication Data

US 2009/0074558 A1 Mar. 19, 2009

(30) Foreign Application Priority Data

Sep. 18, 2007 (DE) ......................... 10 2007 044 713
Mar. 20, 2008 (DE) ......................... 10 2008 015 313
Apr. 4, 2008 (DE) ......................... 10 2008 017 191

(51) Int. Cl.
*G06F 7/00* (2006.01)
*B07C 3/00* (2006.01)

(52) U.S. Cl.
CPC ........................................ *B07C 3/00* (2013.01)

(58) Field of Classification Search
CPC ........................................................ B07C 3/00
USPC ................... 700/223–226, 228; 209/583–584
See application file for complete search history.

(56) References Cited

U.S. PATENT DOCUMENTS 6,316,741 B1 * 11/2001 Fitzgibbons et al. ......... 209/584
6,741,908 B2 * 5/2004 Vanderbles et al. .......... 700/224
6,888,084 B1 5/2005 Bayer
6,892,890 B2 * 5/2005 Dominguez .................. 209/559
2004/0035762 A1 * 2/2004 Brown .......................... 209/584
2005/0269395 A1 12/2005 Miette et al.
2006/0108266 A1 * 5/2006 Bowers et al. ................ 209/584
2006/0213818 A1 * 9/2006 Madar et al. .................. 209/584
2006/0259186 A1 * 11/2006 Cartal et al. .................. 700/226

FOREIGN PATENT DOCUMENTS

| | | | |
|---|---|---|---|
| DE | 40 00 603 | C2 | 4/1998 |
| DE | 10 2005 040 689 | A1 | 3/2007 |
| EP | 1 222 037 | B1 | 7/2002 |
| WO | 2006012939 | A1 | 2/2006 |
| WO | 2006012998 | A1 | 2/2006 |
| WO | 2007/022876 | A1 | 3/2007 |

* cited by examiner

*Primary Examiner* — Kyle Logan
(74) *Attorney, Agent, or Firm* — Laurence Greenberg; Werner Stemer; Ralph Locher

(57) ABSTRACT

A method and device for processing and transporting items, particularly mail items, measure a processing attribute for each item. A value which each predefined feature assumes for the item is measured. A data record for the item is generated including the measured feature values and the measured processing attribute value. The item is transferred into an intermediate storage device, into a transport device and to a processing system. After reaching the processing system, a value is newly measured which each predefined feature assumes for this item. The data record generated for this item is determined using the feature values from the new measurement. If this item has an identification read clearly during the new measurement, the data record is determined based on this identification. Otherwise, a search with a restricted search space is executed. The processing system processes the item using the processing attribute value in the determined data record.

5 Claims, 8 Drawing Sheets

METHOD AND DEVICE FOR PROCESSING AND TRANSPORTING ITEMS IN A SEQUENCE

CROSS-REFERENCE TO RELATED APPLICATION

This application claims the priority, under 35 U.S.C. §119, of German Patent Application DE 10 2007 044 713.4, filed Sep. 18, 2007, German Patent Application DE 10 2008 015 313.3, filed Mar. 20, 2008 and German Patent Application DE 10 2008 017 191.3, filed Apr. 4, 2008; the prior applications are herewith incorporated by reference in their entirety.

BACKGROUND OF THE INVENTION

Field of the Invention

The invention relates to a method and a device for processing and transporting items, in particular mail items.

A mail item typically passes through a sorting system at least twice and is then transported to the respectively predefined destination address. The destination address of the mail item is read during the first pass. The read destination address is determined again during the second pass.

Traditionally, a coding of the destination address is printed onto the mail item during the first pass. That coding is read during the second pass. In order to avoid printing on mail items, it is proposed in German Patent DE 40 00 603 C2 that a feature vector of the mail item be measured during the first pass and that feature vector is stored together with the read destination address. During the second pass, the mail item is measured anew, with a further feature vector being generated in that way. That further feature vector is compared with the stored feature vectors in order to find the stored feature vector of the same item. The destination address which is stored together with the found feature vector is used as the destination address to which the mail item is to be transported.

That search requires that many feature vectors be compared with one another, which is time-consuming. As the number of transported mail items grows, the risk that the wrong feature vector will be found among the stored feature vectors increases. Restrictions on the search space have therefore already been proposed.

A method with the steps of the prior art and a device with the features of the prior art are known from European Patent EP 1 222 037 B1, corresponding to U.S. Pat. No. 6,888,084. The items there are likewise mail items which pass through sorting machines. Such a sorting machine discharges mail items into sorting terminals which function as intermediate storage devices. In order to reuse read results, a method is used which is known as fingerprinting and which is presented e.g. in German Patent DE 40 00 603 C2.

For each mail item a data record is generated and filed in a central database. That data record includes the read delivery address. In order to restrict the search space when searching for that data record, a record of which mail item is transported in which container is stored. That approach requires that it be known precisely which mail item is transported in which container. In reality, that can sometimes not be established with sufficient certainty.

It is proposed in German Published, Non-Prosecuted Patent Application DE 10 2005 040 689 A1 that a mail item be identified in two steps. Firstly, the mail item is registered e.g. in a central database through the use of a visual feature and an external piece of information. As soon as that mail item passes through a sorting system for a second time, an attempt is made firstly to identify that mail item on the basis of the visual feature. If that is unsuccessful, the mail item is identified on the basis of the external feature.

A method for checking a bar code on a mail item is known from U.S. Patent Application Publication No. US 2005/0269395 A1. In a first sorting pass, a unique identification in the form of a bar code is printed on the mail item. In addition, a feature vector is generated for the mail item, for which purpose an image of the mail item is analyzed. A data record including the feature vector and the identification is stored in a database. The mail item passes through a sorting system for a second time. If that sorting system is unable to read the bar code successfully, then a feature vector is generated anew, and the mail item is identified on the basis of the feature vector.

SUMMARY OF THE INVENTION

It is accordingly an object of the invention to provide a method and a device for processing and transporting items in a sequence, which overcome the hereinafore-mentioned disadvantages of the heretofore-known methods and devices of this general type and in which a restriction is implemented on a search space which does not require that an identification of a container used for transportation be read.

With the foregoing and other objects in view there is provided, in accordance with the invention, a method and a device for processing a plurality of items. The method and device comprise predefining at least one measurable processing attribute and at least two measurable features. One of the predefined features is an identification. An item may or may not be furnished with such an identification. If an item is actually furnished with an identification, then this identification distinguishes the item from all other processed items.

A processing system is used.

For each item, the following steps are executed:

The processing attribute of the item is measured, i.e. the attribute value of the processing attribute is determined.

Firstly, a measurement is made of what value each predefined feature assumes for the respective item.

A data record for the item is generated which includes the at least two measured feature values and the measured processing attribute value.

The item is transferred to an intermediate storage device.

The item is then transferred from the intermediate storage device into a transport device and transported in the transport device to the processing system.

After the item has reached the processing system, a fresh or new measurement is made of the value which each predefined feature assumes for this respective item.

The data record generated for this item is determined by using the feature values obtained in the new measurement. If this item is furnished with an identification which is read clearly during the new measurement, then the data record is determined on the basis of this identification. Otherwise, a search is executed, with a restriction on the search space.

The processing system processes the item. For this purpose, the processing system uses the processing attribute value which is contained in the determined data record.

An item sequence is respectively measured for each intermediate storage device being used. This measured item sequence is the sequence in which the items are transferred to the intermediate storage device.

Multiple loading processes are executed during transportation of the items to the processing system. In each loading process, multiple items are respectively transferred from one of the intermediate storage devices into a transport device. This occurs in such a way that the item sequence measured for this intermediate storage device is retained among those items which are transferred into the transport device in this loading process. The overall item sequence can, on the other hand, be modified by various loading processes.

The processing system measures each item anew. This new measurement is executed in a measuring sequence among the items.

As explained previously, the data record for an item with identification is determined through the use of the read identification.

If, on the other hand, it is established during the new measurement that the item has no identification or no clearly legible identification, then a restriction on the search space is implemented in order to determine the data record for this item. This restriction on the search space includes the following steps:

At least one preceding item in the measurement sequence with a clearly legible identification is determined.

At least one succeeding item in the measurement sequence with a clearly legible identification is determined.

For each item determined in this manner, a partial sequence of a measured item sequence is respectively determined. This partial sequence includes the determined item with the unique identification, an item which precedes the determined item with the unique identification in the item sequence and an item which follows the determined item with the unique identification in the item sequence.

The data record for the item without a legible identification is sought among the data records of those items which are contained in at least one determined partial sequence. The search is thus restricted to the data records of the items in the partial sequences.

At least one further feature value of the item without a legible identification, which feature value has been measured during the new measurement, is used in the search for the data record.

This method and device do not use the sequence of the items in the measurement sequence. The search space is preferably further restricted in such a way that deviations between the item sequence and the measurement sequence are utilized.

The processing attribute is, for example, an identification of a destination address to which the item is to be transported, or a dimension or the weight of the item. The processing attribute can also be the result of an analysis of the shipping fee with which the item is furnished.

In one embodiment, each item is furnished with details of the respectively predefined destination point to which this item is to be transported. In particular, the item is a mail item or a freight shipment. In another embodiment, the item is a luggage item of a passenger and is furnished with details relating to the owner. This luggage item is to be transported to a destination address which depends on the identity of the passenger.

Other features which are considered as characteristic for the invention are set forth in the appended claims.

Although the invention is illustrated and described herein as embodied in a method and a device for processing and transporting items in a sequence, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
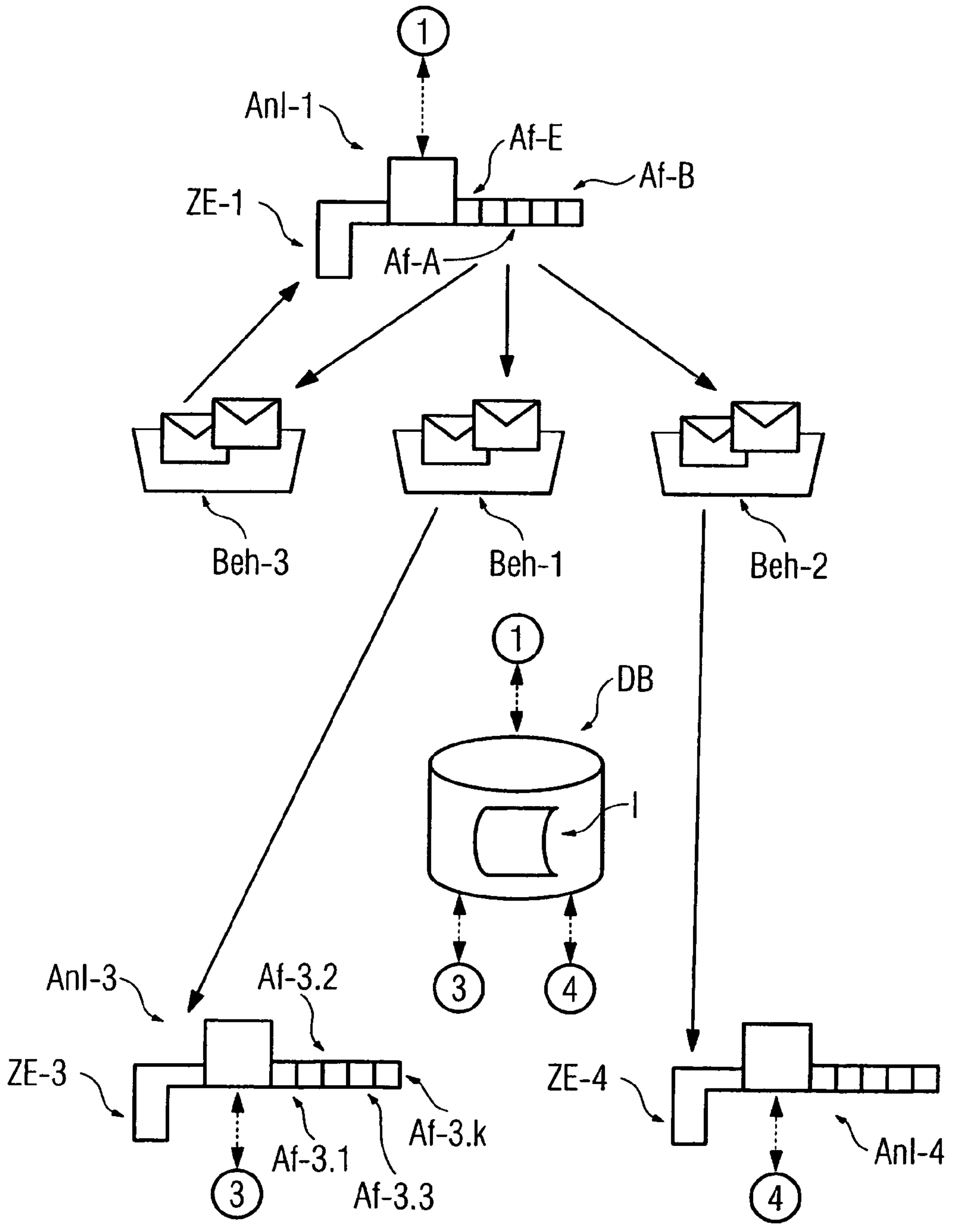
FIG. 1 is a diagram illustrating a network including three processing systems.

Referring now in detail to the figures of the drawings, in which material flows are represented by solid lines and data flows by dashed lines and first, particularly, to FIG. 1 thereof, there is seen an exemplary embodiment in which items to be transported are mail items. Each mail item is furnished with an identification of the delivery address to which the mail item is to be transported. The delivery address functions as the destination point of the mail item. The identification has usually been affixed to the mail item before the commencement of transportation. It is, however, also possible for it to only be affixed during transportation.

Each mail item passes through a sorting system at least twice. It is possible for a mail item to pass through the same sorting system several times or through one sorting system three times.

During the first pass, the destination address of each mail item passing through is read.

Preferably, a reading device of the sorting system used during the first pass firstly attempts to determine the delivery address automatically through the use of optical character recognition (OCR). If this is unsuccessful, then a person reads the delivery address and inputs at least a part of the read delivery address, e.g. the zip code.

A delivery area is assigned to each possible delivery address. During each pass, all mail items to the same delivery area are discharged into the same output compartment. It is possible for mail items to different delivery areas to be discharged into the same output compartment. It is possible for a mail item to pass through the same sorting system several times, for example because the number of output compartments is lower than the number of predefined delivery areas. In this case, n-pass sequencing, where n>=2, is preferably executed. Such a method is known from European Patent EP 0 948 416 B1, corresponding to U.S. Pat. No. 6,703,574. After the first pass, the mail items which the sorting system has discharged into an output compartment are transferred into a container. The container is transported to the feeding device of the second sorting system, and the mail items are fed into the sorting system for the second pass.

It is also possible for a container with mail items which have passed through a sorting system for the first time to be transported to a different location and for the mail items to be fed there into a further sorting system. It is also possible for some mail items to be transported in a container from an output compartment of the further sorting system to a feeding device of another sorting system and for these mail items to be fed into the other sorting system.

It would be highly impractical if each further sorting system had to read anew the delivery address which the first sorting system had already read. The traditional procedure for avoiding that is for the first sorting system to print a coding of the delivery address on to the mail item, e.g. in the form of a bar code. Each further sorting system reads that bar code.

However, it is frequently not desirable for a mail item to be furnished with a bar code. An agreement of the Universal Postal Union (UPU) provides that cross-border mail items shall not be furnished with a bar code, since different postal service providers normally use different coding systems.

Therefore, in the exemplary embodiment, a method is used which has come to be known by the name of “fingerprinting” or “virtual ID” and is described e.g. in German Patent DE 40 00 603 C2 and European Patent EP 1 222 037 B1, corresponding to U.S. Pat. No. 6,888,084, and which enables each further sorting system to determine without a bar code the delivery address which the first sorting system has read.

In the exemplary embodiment, m different features of a mail item are predefined which, as the mail item passes through a sorting system, can be measured optically without the mail item being damaged. Examples of such features are:

a bar code on the front of the mail item, a bar code on the back of the mail item, dimensions of the mail item, a distribution of gray levels and/or color tones on a surface of the mail item, a position and dimension of the franking mark (e.g. stamp or franking machine), a position and size of an address block and/or of details relating to the sender, a logo on the mail item, e.g. a logo of the sender or an advertising imprint, and features of the delivery address, e.g. the zip code.

In the exemplary embodiment, the sorting system furnishes some of the mail items with a unique identification during the first pass, e.g. in the form of a readable number, an ID bar code or a matrix code. This ID bar code or this matrix code distinguishes the mail item from all other mail items which pass through one of the sorting systems within a predefined period of time, and is thus a machine-readable identification of the mail item. The other mail items are not furnished with such a unique identifier but are identified during the second sorting pass with the aid of a fingerprinting method.

FIG. 1 shows a network including three processing systems Anl-1, Anl-3 and Anl-4. These three processing systems are configured in the exemplary embodiment as sorting systems. Each sorting system has a feeding device in the form of a feeder, a reading device and a multiplicity of output compartments. Mail items are fed into the feeder of such a sorting system. The feeder separates the mail items. The separated mail items then pass through the sorting system. The reading device generates an image of the mail item. Using the image, the sorting system determines the delivery address and, depending on the recognized delivery address, discharges the mail item into one of the output compartments. Each of the three sorting systems Anl-1, Anl-3 and Anl-4 is connected to a central database DB and has read and write access to this database DB. Transport information I is stored in the database DB. This information includes measured item sequences and measurement sequences.

In the example shown in FIG. 1, mail items are firstly fed into a feeder ZE-1 of the sorting system Anl-1. The sorting system Anl-1 generates a digital image of each mail item and determines the delivery address. The sorting system Anl-1 firstly attempts to determine the delivery address automatically through the use of optical character recognition (OCR). If this is unsuccessful, the image is transmitted to a video coding station, and an operator inputs the delivery address—or at least the zip code—manually. The sorting system Anl-1 discharges the mail item into one of the output compartments depending on the respectively determined delivery address.

In the example of FIG. 1, three output compartments Af-A, Af-B and Af-E of the sorting system Anl-1 are shown. These three output compartments function in the exemplary embodiment as intermediate storage devices into which the items are discharged and buffered before being transported further.

The mail items which the sorting system Anl-1 has discharged into the output compartment Af-E are transferred in the example of FIG. 1 into a container Beh-3. The container Beh-3 with these mail items is transported again to the feeder ZE-1 of the sorting system Anl-1. The mail items from the container Beh-3 are separated by the feeder ZE-1 and pass anew through the sorting system Anl-1.

In the example of FIG. 1, the mail items are fed from the output compartment Af-E to the feeding device ZE-1 and pass anew through the installation Anl-1. A reason for this may be that n-pass sequencing is being executed, as just described. It is also possible for individual mail items to pass through the sorting system Anl-1 several times because off-line video coding is executed. During the first pass, a digital image of the mail item is generated. If the address in this image cannot be recognized automatically, the image is transmitted to a video coding station. There, the address is input manually. After this has happened, the mail item passes through the sorting system anew and is discharged into an output compartment, depending on the address being input. It is also possible for mail items to be sent within a location or delivery area, and for these mail items the first sorting system Anl-1 therefore executes both the incoming sorting and the subsequent outgoing sorting.

In the exemplary embodiment, containers are used in order to transport the mail items from the output compartment Af-E to the feeding device ZE-1. The container is transported manually or e.g. through the use of a reloading bridge. It is also possible to use e.g. a conveyor belt, onto which stacks of mail items are placed, instead of containers.

The mail items which the sorting system Anl-1 has discharged into the output compartment Af-A are transferred in the example of FIG. 1 into a container Beh-1. The container Beh-1 with these mail items is transported to the feeder ZE-3 of the sorting system Anl-3. The mail items from the container Beh-3 are separated by the feeder ZE-3 and pass through the sorting system Anl-3. Analogously, the same occurs with the mail items which the first sorting system Anl-1 has discharged into the output compartment Af-B. These are transported in the container Beh-2 to the feeder ZE-4 of the third sorting system Anl-4. The mail items which the sorting system Anl-1 discharges into the output compartment Af-E are transported in the container Beh-3 to the feeding device ZE1 and pass anew through the sorting system Anl-1.

The two remaining sorting systems Anl-3 and Anl-4 use anew the reading result which the sorting system Anl-1 has obtained. In order to make this possible, the sorting system Anl-1 generates a data record for each mail item that passes through the sorting system Anl-1 and stores it in the central database DB as part of transport information 1. This data record includes:

an internal identifier of the mail item and a coding for the processing attribute value, i.e. in this case the delivery address, which the first sorting system Anl-1 has read.

Each further sorting system through which the mail item passes, recognizes this mail item. The aforementioned m features which are optically measurable are predefined for this purpose.

The first sorting system Anl-1 determines, for each mail item which passes through the sorting system Anl-1, what value each predefined feature respectively assumes in this mail item. In this way, the first sorting system Anl-1 generates a feature vector which, where n features are predefined, is formed of n feature values. The first sorting system Anl-1 supplements the data record for the mail item with the feature vector, i.e. with a coding of the n feature values.

The third sorting system Anl-3 also measures, for each mail item which passes through the sorting system Anl-3, what value each predefined feature assumes for this mail item. In this way, the third sorting system Anl-3 also generates a feature vector including n feature values. The third sorting system Anl-3 performs a read access to the central database DB. The feature vectors of stored data records are compared with the currently measured feature vector. In this way, the data record which originates from the mail item currently under examination is determined. This data record includes the delivery address of the mail item which the first sorting system Anl-1 has read.

In this embodiment, a coding of the delivery address to which a mail item is to be transported is stored respectively in the data record of the mail item. This delivery address functions as the processing attribute of the item. In other embodiments, other processing attributes, e.g. a weight or a dimension or a surface characteristic of the mail item, are additionally measured and stored during the first sorting pass. The processing attribute can also be a forwarding address or an endorsement which is filed in a database. The result of an analysis of a franking mark with which the mail item is furnished, e.g. the result of the check as to whether or not a letter is adequately franked, can also be used as the processing attribute.

The method according to the invention is applied to each output compartment of the first sorting system Anl-1. An item sequence is respectively measured for each output compartment. The method will be explained below, taking the output compartment Af-A as an example.

Figure 2:
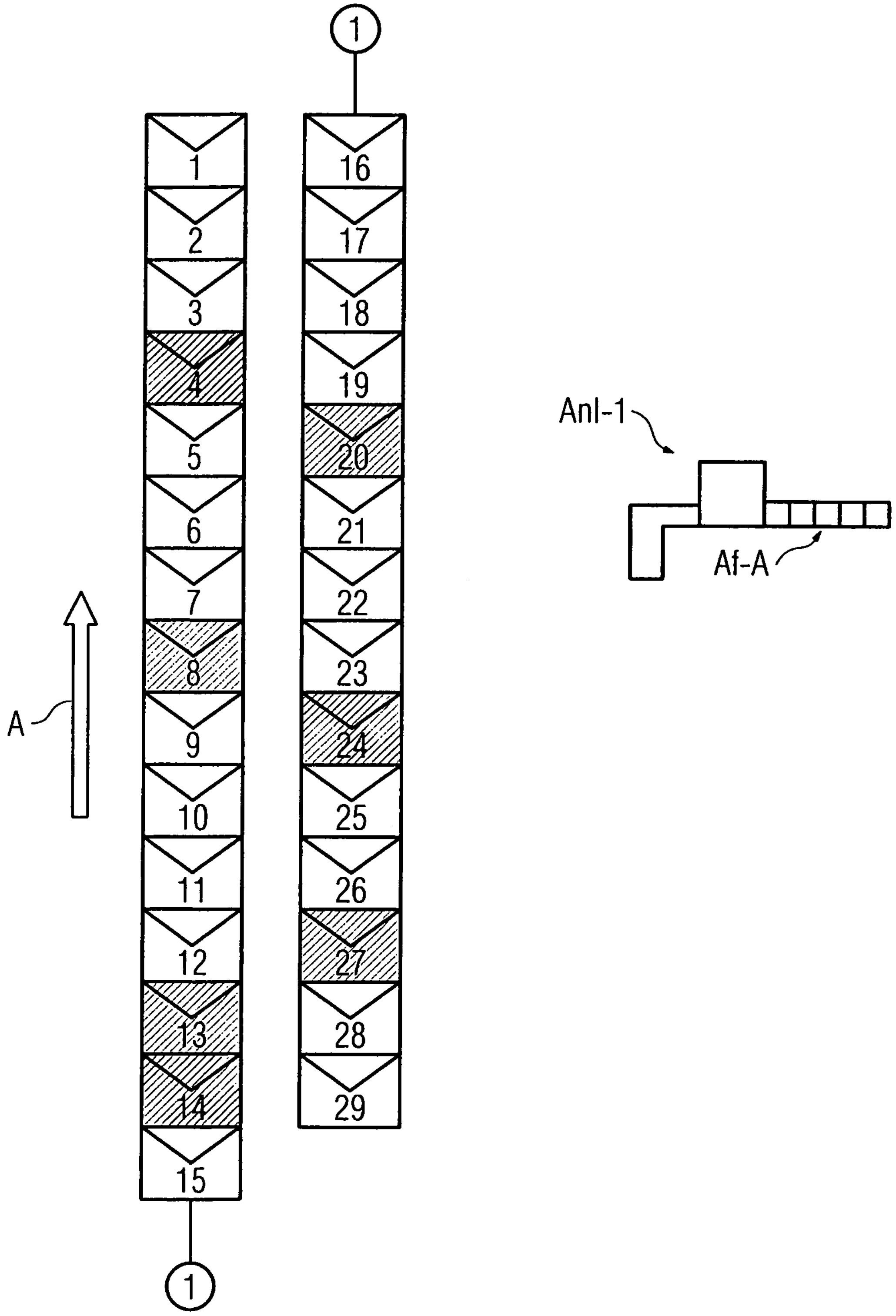
FIG. 2 is a diagram illustrating an item sequence in which 29 mail items are discharged into an output compartment Af-A.

In the example of FIG. 2, the first sorting system Anl-1 discharges 29 mail items 1, 2, 3, 4, . . . 28, 29 consecutively into the output compartment Af-A. The discharge sequence 1, 2, 3, 4, . . . 28, 29 is labeled A in FIG. 2 and is an integral part of the item sequence for the output compartment Af-A. These 29 mail items are then again fed consecutively into a sorting system. In the exemplary embodiment, they are fed into the feeding device ZE-3 of the sorting system Anl-3 in the following sequences:

firstly, a first sequence A1 including the mail items 10, 11, . . . , 15 then, a second sequence A2 including the mail items 1, 2, . . . , 9 then, a third sequence A3 including the mail items 22, 23, . . . , 27 then, a fourth sequence A4 including the mail items 16, 17, . . . , 21 and finally, a fifth sequence A5 including the mail items 28 and 29.

Each sequence of mail items is transferred into a container in this order after the first sorting pass. It is possible for several sequences to be transferred consecutively into the same container. Each loading of a container with a sequence of mail items functions as a loading process of the container.

Figure 3:
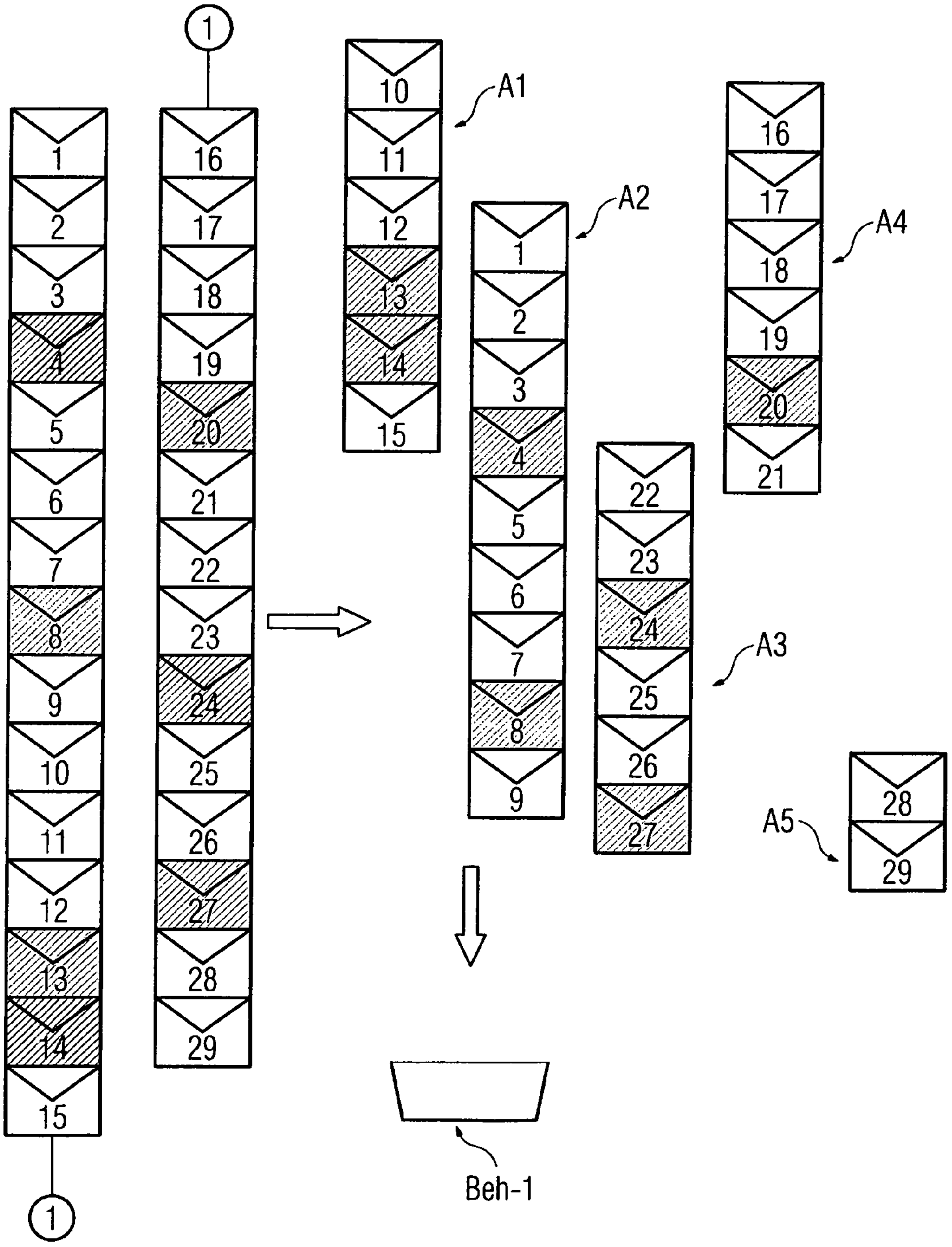
FIG. 3 is a diagram illustrating a sequence in which the 29 mail items are transferred from the output compartment Af-A into a container Beh-1.

FIG. 3 shows a sequence in which the 29 mail items are transferred from the output compartment Af-A into the container Beh-1. Firstly, the first sequence is transferred into the container Beh-1, then the second sequence and so forth. The 29 mail items in the container Beh-1 are in this order. They are transported together in the container Beh-1 to the feeding device ZE-3 and then pass through the sorting system Anl-3.

The container which is respectively used is unloaded in such a way that the order is retained among the mail items of a sequence, but the order among the sequences can be changed. The sequences in the exemplary embodiment are used in the loading processes, but are not determined.

In the second pass, the 29 mail items pass through the sorting system as follows: firstly the mail items of the first sequence, then those of the second sequence, then of the third sequence and so on until the final sequence 28, 29. This order functions as the measurement sequence, since the mail items are measured in this order during the second sorting pass.

Figure 4:
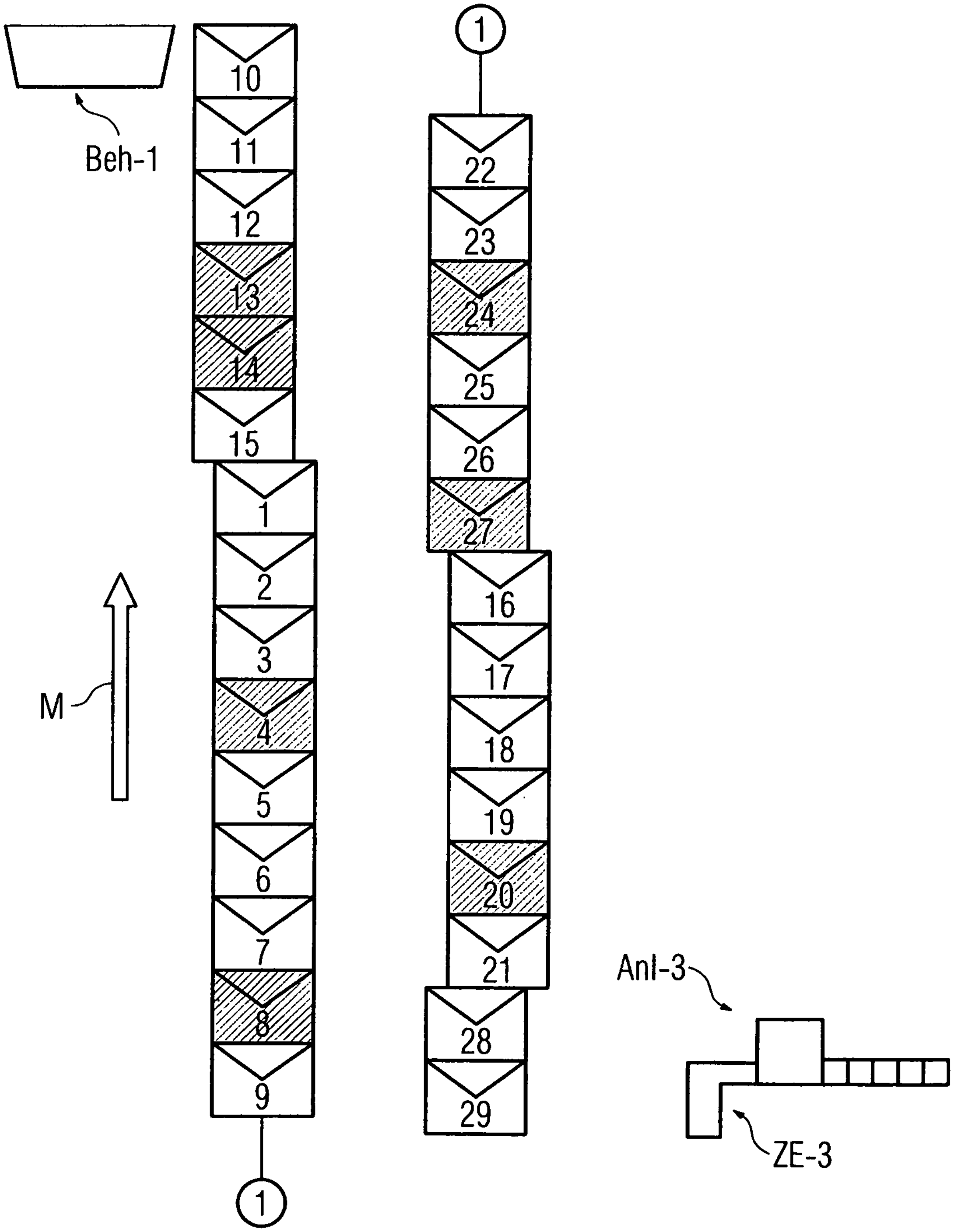
FIG. 4 is a diagram illustrating a sequence in which the 29 mail items from the output compartment Af-A in FIG. 3 pass through a sorting system Anl-3.

FIG. 4 shows the order in which the 29 mail items from the output compartment Af-A in FIG. 3 pass through the sorting system Anl-3.

During the second pass, an attempt is made initially to identify each mail item passing through with the aid of a globally unique feature. In the exemplary embodiment, this feature is an imprinted unique identification. This unique identification distinguishes a marked mail item from all other mail items which pass through one of the sorting systems within a predefined time period. The identification can be printed on the front or on the back of the mail item and takes the form of a number, a bar code or a matrix code containing encrypted information. The identification can also be printed on a label which is affixed to the mail item.

In the example, the mail items 1, 2, 3, 5, . . . can be uniquely identified in the second sorting pass. The remaining mail items cannot be identified during the second sorting pass from an imprinted and globally unique identification, e.g. because they have no unique identification or because this is not machine-readable without errors. These mail items without a unique readable identification are marked gray in FIG. 2 and the figures that follow.

A number n_la (la=look ahead) is predefined. In the exemplary embodiment, n_la=2. This number n_la is predefined so as to be as large as possible and as small as necessary and depends on the following features, which restrict the number n-la to an upper limit:

the maximum response time which may lapse between the time at which the mail item passed the reading device and the determining of the data record for this mail item, the transportation speed with which the mail items are transported, the gap between two mail items, and the processing time required with respect to one mail item for reading an identification on the mail item and calculating the feature vector if no clearly readable identification is present.

In addition, a number n_lb (lb=look back) is predefined. This depends solely on the computational capacity. In the example, n_lb=n_la=2.

In the example of FIG. 2 and the figures that follow, the mail item 8 has no identification that can be deciphered clearly in the second sorting pass. The following steps are therefore executed:

An attempt is made to read the n_la identifications of those mail items which follow the mail item 8 in the second sorting pass.

Figure 5:
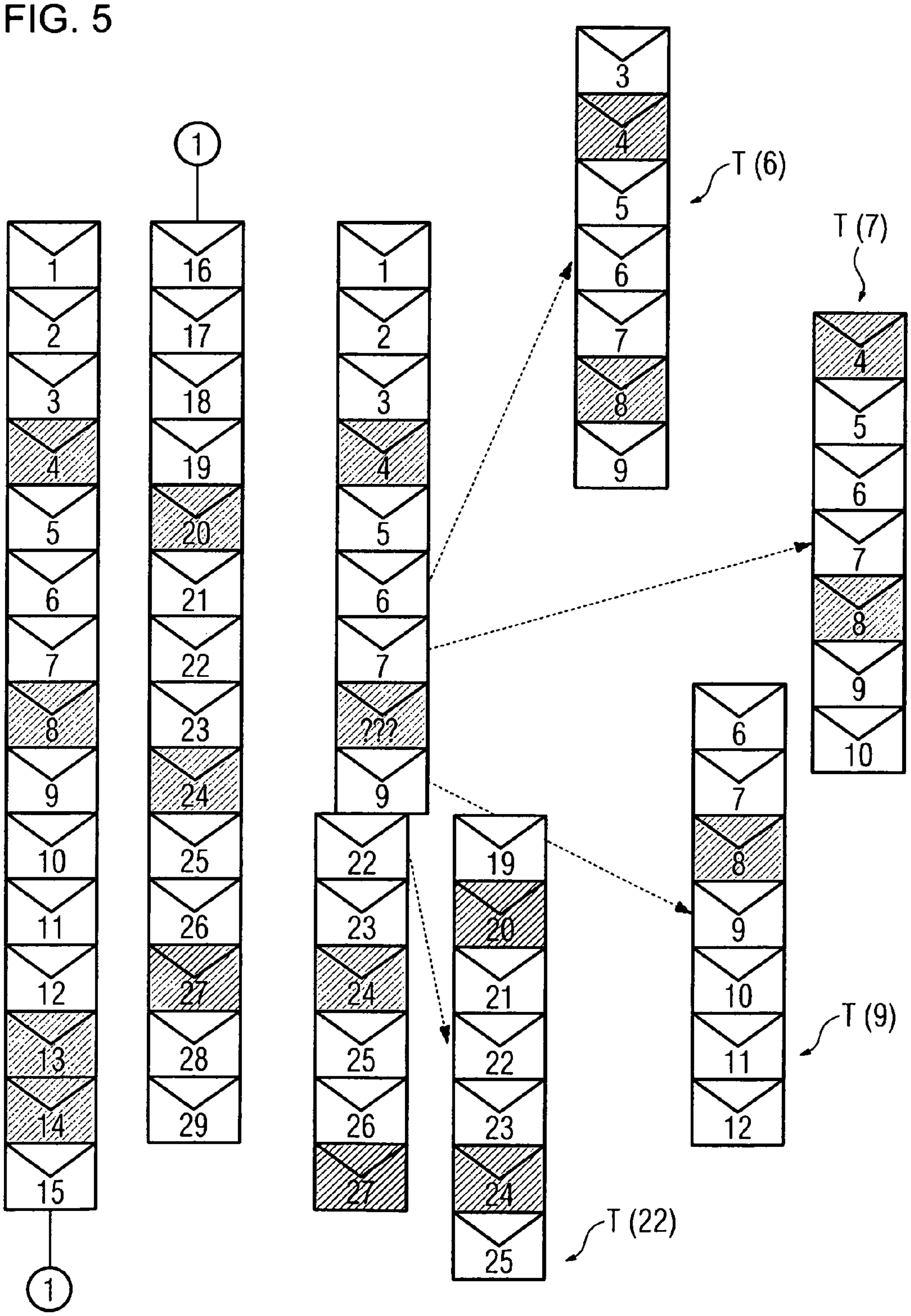
FIG. 5 is a diagram illustrating determined partial sequences and a search space for the example of FIG. 4 and a mail item 8.

In the example of FIG. 5, the mail items 9 and 22 are determined in this way, since n_la is equal to 2 and their unique identifications are recognized, and the mail items 9 and 22 are the two succeeding mail items and have clearly readable identifications. A "look ahead" of two mail items is thus executed.

It is also determined which identifications of the n_lb preceding mail items have been read. In the example of FIG. 3, these are the identifications of the n_lb=2 mail items 6 and 7.

FIG. 5 illustrates which four partial sequences are determined in the example of FIG. 3 and FIG. 4.

It is also possible for at least one of the n_la preceding mail items or at least one of the n_lb succeeding mail items to likewise not be furnished with an identification that is clearly readable.

The stored item sequence in which the mail items are discharged after the first sorting pass is used in order to determine a partial sequence for the n_la succeeding and the n_lb preceding mail items, respectively.

It is assumed that Ps-x is a mail item with no legible identification. For each mail item Ps which succeeds or precedes the mail item Ps-x, n_nf mail items are determined which follow after the mail item Ps in the item sequence, and n_vl mail items are determined which precede the mail item Ps in the item sequence.

In this case, n_vl>=n_la and n_nf>=n_lb are two predefined numbers. In the exemplary embodiment, n_vl=n_nf=3.

It is possible that this sequence will be changed during the second sorting pass.

Through the use of this approach, a partial sequence of maximally (n_vl+n_nf+1) mail items is determined from the item sequence. This partial sequence is formed of the mail item Ps itself as well as the n_vl mail items before the mail item Ps and the n_nf mail items after the mail item Ps. It is possible that fewer than n_vl mail items will precede the mail item Ps or that fewer than n_nf mail items will succeed the mail item Ps. Since n_vl>=n_la and n_nf>=n_lb apply, the mail item Ps-x is included in this partial sequence.

Thus, in total, (n_la+n_lb) partial sequences, each including a maximum of (n_vl+n_nf+1) mail items, are determined. The mail item Ps-x is included in each of these partial sequences.

A search-space restriction is undertaken. In one embodiment, the data record for the mail item 8 is sought only among the data records for those mail items which occur in at least one of the determined (n_la+n_lb) partial sequences. The search space is thus restricted to the data records of the partial sequences. In this embodiment, the order of the mail items in these partial sequences is not needed.

Since, during each loading process, multiple mail items are respectively transferred into a transport device without the order of these mail items being changed, it suffices if, during the second sorting pass, only two partial sequences are determined, namely the partial sequence of the first preceding mail item with a clearly readable identification and that of the first succeeding mail item with a clearly readable identification.

Thus, in the example of FIG. 3, it suffices if, when restricting the search space for the mail item 8, firstly an attempt is made to read the unique identification of the mail item 7. It is only if this is unsuccessful that the unique identification of mail item 6 is read, then that of mail item 5, until n_la preceding mail items have been examined. The same applies by analogy to the succeeding mail items 9, 22 and so on.

In the example of FIG. 4, using the item sequence, the following (n_la+n_lb)=4 partial sequences are determined overall in order to restrict the search space for the mail item 8:

for the preceding mail item 6, the partial sequence T(6) including the mail items 3, 4, 5, 6, 7, 8, 9, wherein the mail items 3, 5, 6, 7, 9 have legible identifications, for the preceding mail item 7, the partial sequence T(7) including the mail items 4, 5, 6, 7, 8, 9, 10, wherein the mail items 5, 6, 7, 9, 10 have legible identifications, for the succeeding mail item 9, the partial sequence T(9) including the mail items 6, 7, 8, 9, 10, 11, 12, wherein the mail items 6, 7, 9, 10, 11, 12 have legible identifications, for the succeeding mail item 22, the partial sequence T(22) including the mail items 19, 20, 21, 22, 23, 24, 25, wherein the mail items 19, 21, 22, 23, 24 have legible identifications.

Each of these partial sequences is formed of (n_vl+n_nf+1)=7 mail items, respectively.

The search space is restricted to the data records for those mail items which occur in at least one of these determined partial sequences.

In the example shown in FIG. 4, the search space is restricted to the data records for those mail items which occur in at least one of the determined four partial sequences T(6), T(7), T(9) and T(22). These are, in total, the data records for the mail items 3, 4, . . . , 12, 19, . . . , 25.

A development of this embodiment reduces the search space. In this embodiment, the respective order of the mail item in each partial sequence is additionally used to restrict the search space.

Figure 6:
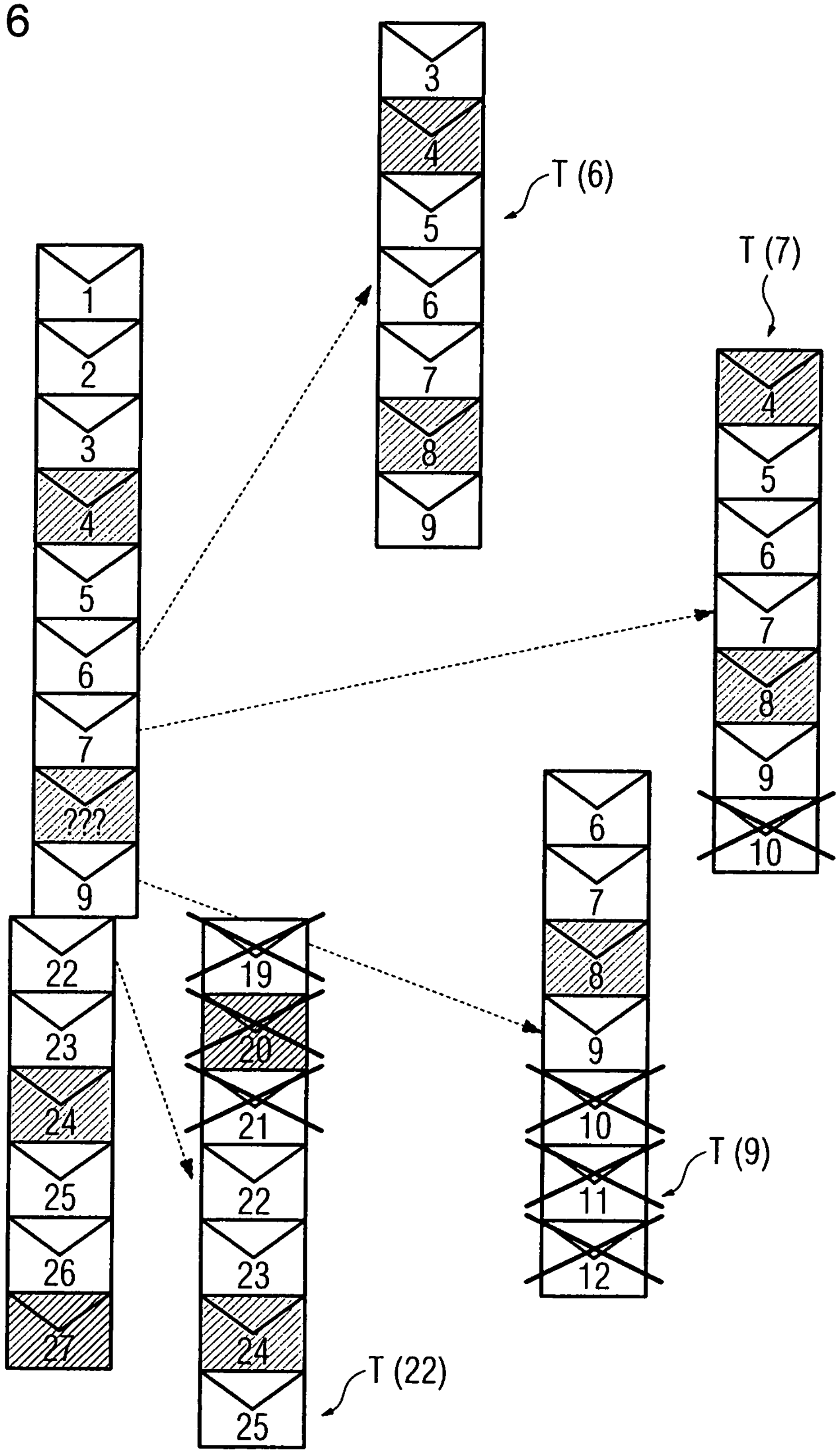
FIG. 6 is a diagram illustrating a reduction of partial sequences of FIG. 5 with the aid of an item sequence.

FIG. 6 shows this development, based on the example of FIG. 4.

The partial sequence T(7) from FIG. 4 for the mail item 7 is formed of the mail items 4, 5, 6, 7, 8, 9, 10. In the second sorting pass, it is recognized through reading of the unique identifications that after mail item 9 does not come mail item 10, which follows 9 in the item sequence, but mail item 22. The mail item 10 is therefore deleted from the partial sequence T(7) including mail items 4, 5, 6, 7, 8, 9, 10 for mail item 7, so that the partial sequence 5, 6, 7, 8, 9 remains. The recognized mail item 10 cannot be the mail item 8 that is sought.

The partial sequence T(9) for the mail item 9 is formed of the mail items 6, 7, 8, 9, 10, 11, 12. Again, the fact is exploited that in the second sorting pass the mail item 9 is not followed by the mail item 10. The mail items 10, 11, 12 are therefore deleted from the partial sequence 6, 7, 8, 9, 10, 11, 12.

The partial sequence T(22) for the mail item 22 is formed of the mail items 19, 20, 21, 22, 23, 24, 25. The mail item 22 is preceded in the second sorting pass not by the mail item 21, but by the mail item 9. The mail items 19, 20, 21 are therefore deleted from the partial sequence 19, 20, 21, 22, 23, 24, 25.

After the reduction, the data records for the mail items 3, 4, . . . , 9, 22, . . . 25 remain as the search space.

The search space is further restricted by those mail items which precede the mail item 8 and have identifications which have already been clearly recognized, if the mail item 8 is to be identified. In the example of FIG. 5 and FIG. 6, these are the mail items 5, 6, 7.

The method will now be explained, taking the mail item 27 as an example. No identification can be read clearly in the second sorting pass for this mail item 27 either. The mail item 27 is located at the end of the sequence A3.

Figure 7:
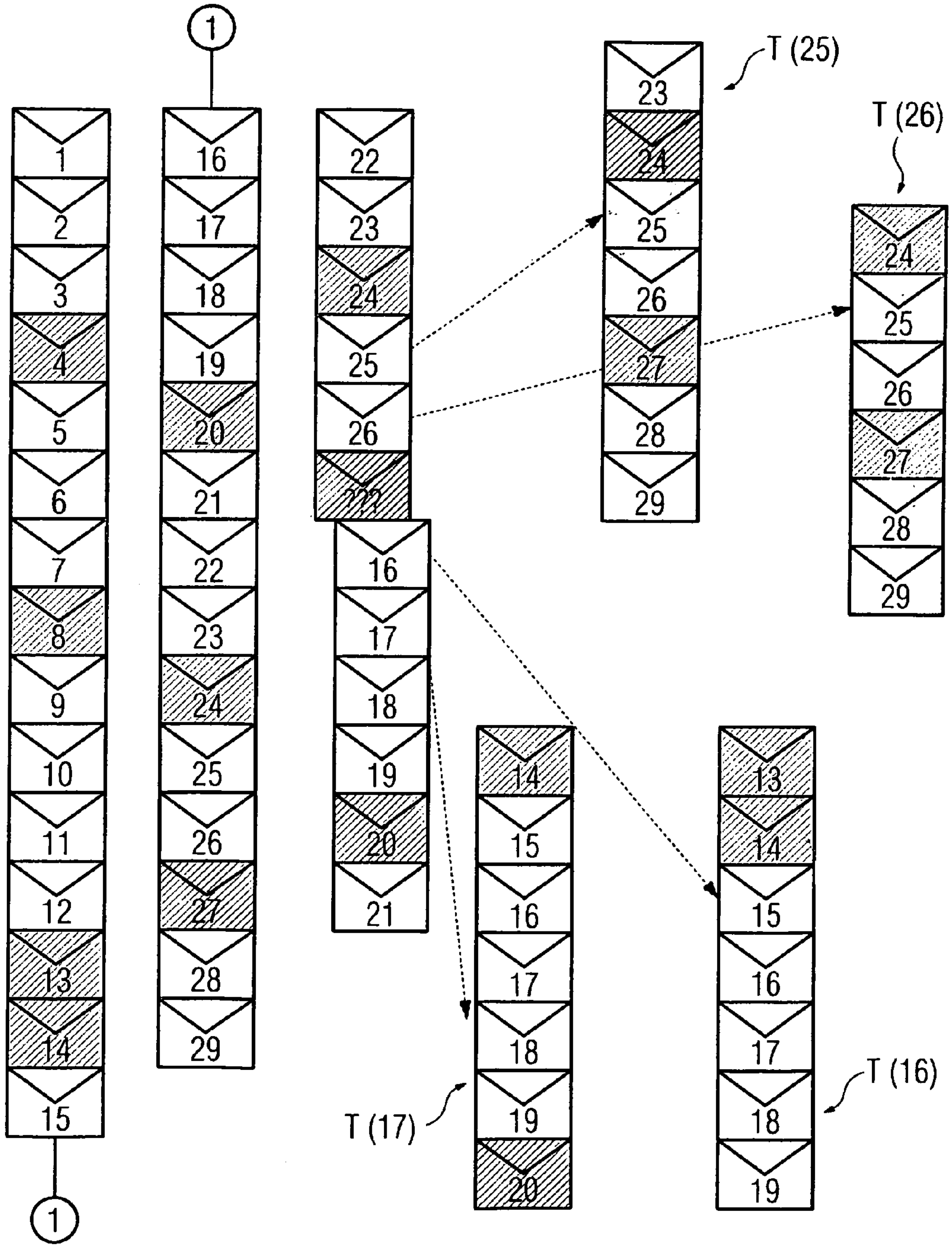
FIG. 7 is a diagram illustrating determined partial sequences and the search space for the example of FIG. 4 and a mail item 27.

In the second sorting pass, the mail item 27 is preceded by the two mail items 25 and then 26 and followed by the two mail items 16 and 17. These four mail items were also identified clearly in the second sorting pass on the basis of their identifications. Therefore, four partial sequences are again determined, namely the partial sequences T(16), T(17), T(25) and T(26). These four determined partial sequences are shown in FIG. 7. The partial sequence T(26) is formed of only 6 mail items, because the mail item 29 is the last in the item sequence. The search space for the mail item 27 is formed of the data records for the mail items 13, . . . , 20, 23, . . . , 29.

Figure 8:
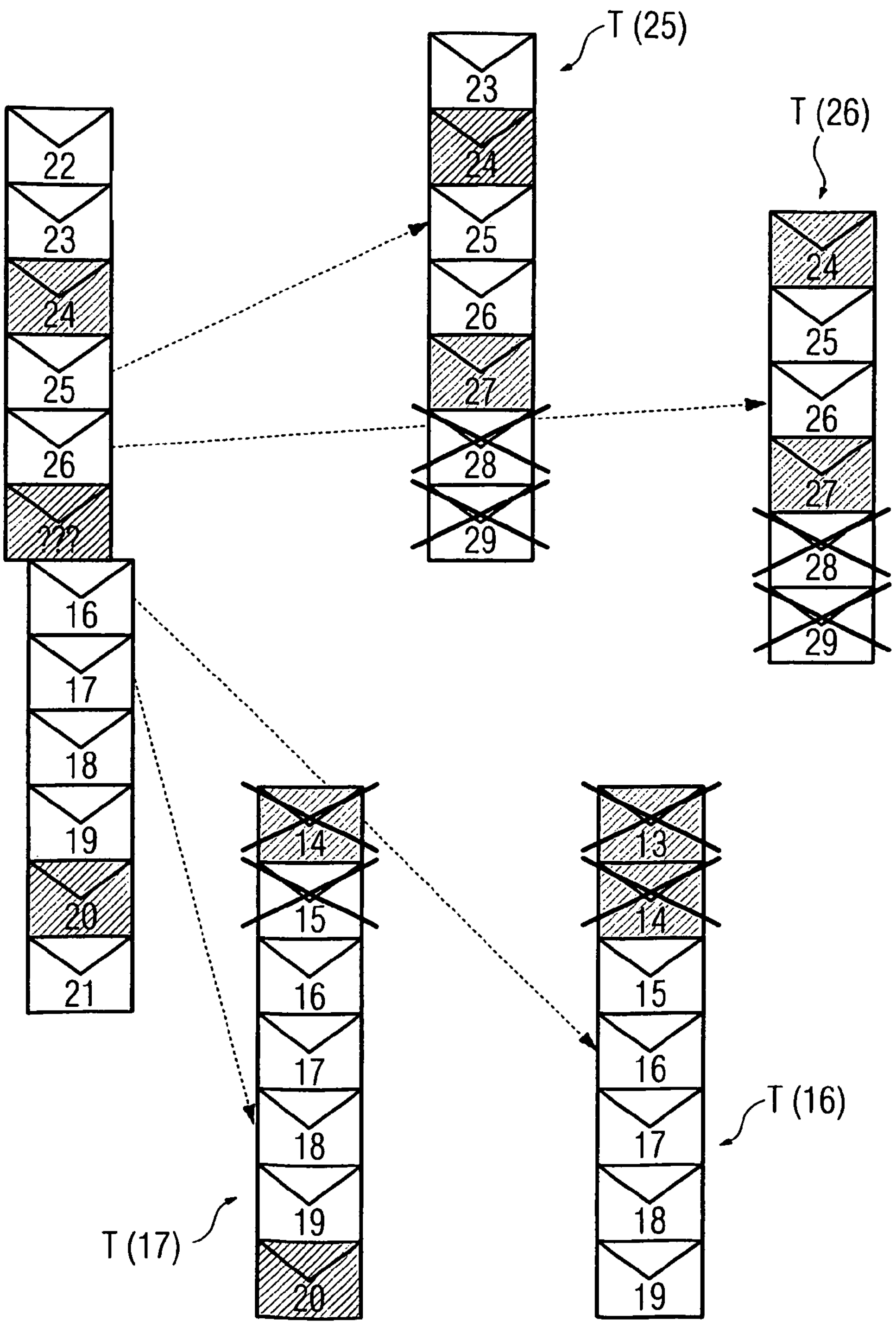
FIG. 8 is a diagram illustrating a reduction of the partial sequences of FIG. 7 with the aid of the item sequence.

FIG. 8 shows the reduced partial sequences from FIG. 7. This results in a reduced search space which is formed only of the data records for the mail items 15, 20, 23, 27.

The invention claimed is:

1. A method for processing a plurality of items, the method comprising the following steps:

predefining at least one measurable processing attribute and at least two measurable features, one of the measurable features being an identification which an item may or may not be furnished with, the identification distinguishing the item with the identification from all other processed items;

providing a processing system;

executing the following steps for each item:

measuring a value assumed by the processing attribute for the item;

measuring a value assumed by each respective predefined feature for the item;

generating a data record for the item including the measured feature values and the measured processing attribute value;

transferring the item into an intermediate storage device, then transferring the item from the intermediate storage device into a transport device and transporting the item in the transport device to the processing system;

after the item has reached the processing system, newly measuring the respective value assumed by each predefined feature for the item;

determining the data record generated for the item by using the feature values obtained when measuring anew;

processing the item with the processing system by using the processing attribute value of the determined data record;

for each intermediate storage device being used, measuring an item sequence in which the items are respectively transferred into the intermediate storage device;

including several loading processes in the transporting of the items to the processing system;

in each loading process, transferring multiple items from an intermediate storage device into a transport device such that the item sequence measured for the intermediate storage device among the items is retained;

executing the new measurement in a measurement sequence among the items;

upon making a new measurement for an item with an identification having been read, determining the data record for the item with the read identification; and upon establishing that the item has no identification or no clearly readable identification when making a new measurement, executing the following steps:

determining at least one preceding item in the measurement sequence with a clearly readable identification and at least one succeeding item in the measurement sequence with a clearly readable identification;

for each item so determined, determining a partial sequence of a respective measured item sequence with the partial sequence including the determined item and at least one item preceding and one succeeding the determined identified item in the respective item sequence;

searching for the data record for the item with no readable identification among the data records of those items contained in at least one determined partial sequence; and using at least one further feature value of the item, with the feature value having been measured during the new measurement, for the search for the data record.

2. The method according to claim 1, which further comprises:

for at least one partial sequence having been determined for a determined item with a clearly read identification:

checking if the measurement sequence deviates from the sequence set by the partial sequence;

using item identifications therefor having been clearly read during the new measurement; and in the event of a deviation, deleting those items with identifications occurring at a different position in the measurement sequence than in the item sequence, from the determined partial sequence.

3. The method according to claim 1, which further comprises:

providing each item to be processed with an identification of a destination address to which the item is to be transported;

using the destination address with which the item is provided as a processing attribute value; and including, in the processing of the item by the processing system, a step of triggering, with the processing system, a transportation of the item to the particular destination address included in the determined the data record.

4. A device for processing a plurality of items, the device comprising:

a first processing system;

a second processing system;

a database connected to both of said first and second processing systems;

at least one transport device;

at least one intermediate storage device;

at least one measurable predefined processing attribute and at least two measurable predefined features are predefined, one of the predefined features being an identification which an item may or may not be furnished with, the identification distinguishing the item with the identification from all other processed items;

said first processing system being configured, for each item, to:

measure a value assumed by the processing attribute for the item;

measure a value assumed by each predefined feature for the respective item;

generate and store in said database a data record for the item including the measured feature values and the measured processing attribute value; and transfer the item into said intermediate storage device;

said at least one transport device receiving the item being transferred from said intermediate storage device and transporting the item to said processing system;

said second processing system being configured, for each item, to:

measure anew, after the item has reached said processing system, the value assumed by each predefined feature for the respective item;

determine the data record generated and stored for the item using the feature values obtained in the new measurement;

process the item using the processing attribute value of the determined data record;

said first processing system being further configured to measure, for each intermediate storage device being used, a respective item sequence in which it transfers the items into said intermediate storage device;

said transporting of the items to said processing system including several loading processes;

each loading process transferring multiple items from a respective intermediate storage device into a transport device such that the item sequence measured for said intermediate storage device among the items is retained;

said second processing system being further configured to execute the new measurement in a measurement sequence among the items;

said second processing system being configured, upon the new measurement for an item having an identification being read, to determine the data record for the item by using the read identification; and said second processing system, upon establishing during the new measurement that the item has no identification or no clearly readable identification, being configured to:

determine at least one preceding item in the measurement sequence with a clearly readable identification and at least one succeeding item in the measurement sequence with a clearly readable identification;

determine for each item so determined a respective partial sequence of a measured item sequence with the partial sequence including the determined item and at least one item preceding and one succeeding the determined identified item in the respective item sequence;

search for the data record for the item with no readable identification among the data records of those items contained in at least one determined partial sequence; and use for the search for the data record, performed by said second processing system, at least one further feature value of the item, with the feature value having been measured during the new measurement.

5. The device according to claim 4, wherein:

said second processing system, for at least one partial sequence, having been determined for a determined item with a clearly read identification, is configured:

to check if the measurement sequence deviates from the sequence set by the partial sequence;

to check for which purpose said second processing system uses item identifications which were read clearly during the new measurement; and to delete from the determined partial sequence, in the event of a deviation, those items with identifications occurring at a different position in the measurement sequence than in the item sequence.

* * * * *